US008784109B2

(12) United States Patent
Gottfried (10) Patent No.: US 8,784,109 B2
(45) Date of Patent: Jul. 22, 2014

(54) COGNITIVE ENHANCEMENT (76) Inventor: Bob Gottfried, Toronto (CA)

( * ) Notice: Subject to any disclaimer, the term of this patent is extended or adjusted under 35 U.S.C. 154(b) by 989 days.

(21) Appl. No.: 11/196,290

(22) Filed: Aug. 3, 2005

(65) Prior Publication Data

US 2007/0031798 A1    Feb. 8, 2007

(51) Int. Cl.
*G09B 19/00* (2006.01)

(52) U.S. Cl.
USPC .......................................... 434/236; 434/350

(58) Field of Classification Search
USPC ............................ 434/236, 322–365; 600/300
See application file for complete search history.

(56) References Cited

U.S. PATENT DOCUMENTS

| | | | | |
|---|---|---|---|---|
| 4,730,253 A | * | 3/1988 | Gordon | 434/335 |
| 6,386,881 B1 | * | 5/2002 | Jenkins et al. | 434/236 |
| 7,294,107 B2 | * | 11/2007 | Simon et al. | 600/300 |

* cited by examiner

*Primary Examiner* — Timothy A Musselman
(74) *Attorney, Agent, or Firm* — Knobbe, Martens, Olson & Bear, LLP (57) ABSTRACT

A software program for evaluating and enhancing at least one user cognitive skill, the program including an animation module for displaying at least one first display that includes at least one first object having a first cognitively recognizable changing property of movement and at least one second cognitively recognizable changing property, a response module that receives input from a user signaling device that signals user recognition of the changing, an evaluation module that evaluates the user response based upon at least one evaluation parameter, and an evaluation appraisal module that generates an evaluation display based upon the evaluation.

16 Claims, 11 Drawing Sheets

COGNITIVE ENHANCEMENT

FIELD OF THE INVENTION

The present invention relates to a computer program for enhancing cognitive skills.

BACKGROUND OF THE INVENTION

Cognition is defined as "the act or process of knowing, including both awareness and judgment" (Merriam-Webster Online Dictionary, copyright 2005) and is dependent upon many mental processes, herein: cognitive skills. Three general categories of cognitive skills comprise attention skills, mental processing skills, and audiovisual skills.

Attention Skills include the following cognitive skills:

Working Memory—retaining information until a task is completed;

Attention Duration—sustaining attention until a task is completed;

Short-Term Memory—using information in performing a task;

Selective Attention—focusing on one task at a time;

Divided Attention—focusing on more than one task at a time; and

Range of Focus—changing focus during a task, from narrow to a wide focus or vice versa; and Attention Flexibility—producing a desired level of attention at will.

Mental Processing Skills include the following cognitive skills:

Concept Comprehension—understanding a task;

Sequential Processing—ordering and processing information required for a task;

Simultaneous Processing or Multitasking—processing information for two or more simultaneous tasks;

Processing Speed—the speed it takes to process information for a given task;

Peripheral Vision—perception of objects outside the direct line of vision; and

Information Discrimination—ordering and processing multiple mental, audio, and/or visual information items.

Audiovisual Skills include the following cognitive skills:

Visual Processing—processing visual input;

Auditory Processing—processing auditory input;

Audiovisual Coordination—simultaneous processing of audio and visual input; and

Sensory Motor Coordination—coordinating sensory input, for example, touch or sound, with motor skills, for example, movement.

Attention Focusing

Diseases and/or syndromes associated with improper attention focusing include Attention Deficit Disorder (ADD), Learning Disabilities (LD), and Post-traumatic Stress Disorder (PTSD). Attention deficit disorder, for example, if uncorrected in a student, may prevent focusing for a period sufficient to obtain new information, significantly impairing the student's learning ability.

All brain functions are associated with a predominant brain wave frequency. For example, Beta-1, and Beta-2, brain waves, in the 12-14, Hz and 14-16, Hz frequencies respectively, are associated with attention focusing. Alpha and Theta waves in the 8-12 Hz and 4-8, Hz frequencies respectively, are associated with a relaxed mental state. Additionally, an overabundance of Theta waves is known to interfere with the ability to focus.

One treatment method for attention focusing, called neuro-feedback, encourages brain waves at desired frequencies, and discourages waves at other frequencies. Monastra, et al., in U.S. Pat. No. 6,097,980,, incorporated herein in its entirety by reference, teach neuro-feedback in which a user is connected to an electroencephalograph, (EEG), while audio signals teach the user to produce desirable brain waves.

A drawback of neuro-feedback is the reliance on a complex EEG measuring system under professional supervision, as described in Boyd, W. D., & Campbell, S. E. (1998): The use of EEG biofeedback to treat ADHD in a school setting in *Journal of Neurotherapy,* 2(4), pages 65-70.

Mental Processing

Diseases and/or syndromes associated with improper mental processing include brain injury, for example, Traumatic Brain Injury (TBI), Closed Head Injury (CHI), and Stroke.

Breznitz, in U.S. Pat. No. 6,632,174,, incorporated herein in its entirety by reference, teaches a system that addresses specific cognitive components, and is administered by a trained clinician. Herron, Lois J., in U.S. Pat. No. 6,042,383,, teaches a device for successfully completing a specific motor skill-related task, for example, getting dressed.

Audiovisual Coordination

Diseases and/or syndromes associated with improper audiovisual coordination include aging, fatigue, neuro-chemical imbalance, side affects of medication, and secondary effects associated with primary medical disorders.

The Interactive Metronome, seen at http://www.interactivemetronome.com, administered under clinical supervision, seeks to improve timing of motor skills, for example, clapping to an audio rhythm.

SUMMARY OF THE INVENTION

According to an aspect of some embodiments of the present invention, a software program that installs on a home computer displays audiovisual exercises that enhance one or more user cognitive skills while increasing associated brain waves, the program being adapted to be operated by a user substantially independent of professional supervision.

In an exemplary embodiment, a first session of a first exercise begins with a display of an object, for example, a ball that changes color while randomly moving. On occasion, the display is interrupted with a relaxation display comprising multiple slow moving objects, for example, balloons that float upward on the screen, thereby enhancing user range of focus.

The user is instructed to signal recognition of each color change within a specified time period, for example, by pressing a space bar on a computer keyboard or an accessory input device attached to the computer. Failure to signal within the period, or signaling when there is no color change, results in a brief interjection of an admonition display, for example, the word "miss". Appropriate user response to the color change enhances cognitive skills, including attention and motor coordination, and increases associated brain waves, including desired dominance of Beta waves.

In an exemplary embodiment, the first session is presented at a basic level of complexity comprising a slow moving ball interspersed with a large number of relaxation displays. Subsequent sessions of the first exercise are presented at the same or greater levels of complexity wherein ball speed is increased and/or the number of relaxation displays is reduced; thereby further enhancing cognitive skills and changes in brain waves.

Each user response is evaluated according to one or more evaluation parameters and, at the end of the first session, a parametric-based score is displayed that reflects user performance. Scores reflecting user progress are optionally displayed following user participation in multiple sessions.

With completion of all levels of the first exercise, the user is introduced to additional exercises; each additional exercise includes a new cognitive task in conjunction with the moving ball and relaxation screens. The additional exercises, for example, direct the user to, inter alia, abstain from signaling following visual or auditory cues, signal only in response to a specific object color or sequence of colors, and/or ignore one or more distracting objects appearing in the display.

As the user progresses through the exercises and the increasing levels of complexity, many individual cognitive skills are enhanced while increasing the associated desired brain waves.

There is thus provided a software program for evaluating and enhancing at least one user cognitive skill, comprising an animation module for displaying at least one first display, the at least one first display including at least one first object periodically changing at least one first property comprising a change in a cognitively recognizable state, a response module that receives input from a user signaling device that signals user recognition of the changing, an evaluation module that evaluates the user response based upon based upon at least one evaluation parameter, and an evaluation appraisal module that generates an evaluation display based upon the evaluation.

In an exemplary embodiment, the cognitively recognizable changing in the at least one first property includes at least one change in color. Optionally the changing includes changing at least one second property, the second property including changing position during at least one first period of time.

In an exemplary embodiment, following the evaluation display, the animation module is adapted to automatically display at least one second display including at least one first object periodically changing at least one first property and at least one second property, the at least one second property including changing during the at least one first period of time and changing during at least one second period of time, the second period of time being shorter than the first period of time.

Optionally, the at least one evaluation parameter includes at least one of a latency period, an omission, and a commission. The evaluation display additionally includes an admonition display including, for example, the word "MISS" when the evaluated parameter includes at least one of an omission and a commission.

Further, the animation module is adapted to automatically display the at least one first object in at least one of a same size, an intermediate size, and a large size. Optionally, the at least one first display additionally includes an audio module operatively associated with the animation module, the audio module signaling the user to respond to the at least one first cognitively recognizable property by at least one of signaling and refraining from signaling. Optionally, the at least one first display additionally includes at least one second object that changes a property and is cognitively distinct from the at least one first object, the change signaling the user to respond with at least one of signaling and refraining from signaling.

In an exemplary embodiment, the at least one first display additionally includes a distraction, including at least one color distraction display and auditory distraction. Optionally, the at least one first display comprises at least two displays, including at least one relaxation display. Further, the at least two displays are displayed at a level of at least one initial level of complexity, intermediate level of complexity, and advanced level of complexity. Optionally, the recognition enhances at least one desirable brain wave, including at least one wave of beta 1, and beta 2. Additionally, the recognition suppresses at least one undesirable brain wave, including at least one wave of theta and alpha.

In an exemplary embodiment, the invention further includes a user input device that interfaces with the response module, the input device including at least one of a key, a ball, and a pedal.

Further, the at least one enhanced cognitive skill comprises a cognitive skill from at least one of the following cognitive skill categories: attention skills, mental processing skills, and audiovisual skills.

In an exemplary embodiment, the program is adapted to be run on a home computer substantially independent of professional supervision.

There is thus provided a software program for evaluating and enhancing at least one user cognitive skill, the program including an animation module for displaying at least one first display that includes at least one first object that changes at least one first cognitively recognizable property, the at least one property comprising a change in color, a response module that receives input from a user signaling device that signals user recognition of the changing, an evaluation module that evaluates the user response based upon at least one evaluation parameter, and an evaluation appraisal module that generates an evaluation display based upon the evaluation.

In an exemplary embodiment, the at least one first object additionally changes at least one second cognitively recognizable property, the change comprising a change in position occurring during a first period of time.

There is thus provided a software program for evaluating and enhancing at least one user cognitive skill, the program including an animation module for displaying at least one first display that includes at least one first object having a first cognitively recognizable changing property of movement and at least one second cognitively recognizable changing property, a response module that receives input from a user signaling device that signals user recognition of the changing, an evaluation module that evaluates the user response based upon at least one evaluation parameter, and an evaluation appraisal module that generates an evaluation display based upon the evaluation. Optionally, the at least one second cognitively recognizable property includes at least one change in color.

There is thus provided a method for enhancing cognitive skills of a user including displaying an object changing position, tracking the changing position, changing the object color, passing a period of latency, signaling recognition of the changing color, evaluating the latency period, and generating a display based upon the evaluation.

In an exemplary embodiment, the method additionally includes at least one of showing a visual distraction, providing an auditory distraction, and inserting a relaxation display.

Optionally, the changing enhances at least one skill associated with one cognitive skill category from at least one of the following cognitive skill categories: attention skills, mental processing skills, and audiovisual skills.

Furthermore, there is provided a software program for evaluating and enhancing at least one user cognitive skill, adapted to work in conjunction with a pressure sensitive object, the program including an animation module for displaying at least one first display that includes at least one first object having a first cognitively recognizable changing property of movement, and at least one second cognitively recognizable changing property, a response module that receives input from the pressure sensitive object, signaling user recognition of the second changing property following a latency period, an evaluation module that evaluates the user latency period, and an evaluation appraisal module that generates an evaluation display based upon the evaluation.

DESCRIPTION OF EXEMPLARY EMBODIMENTS

Figure 1:
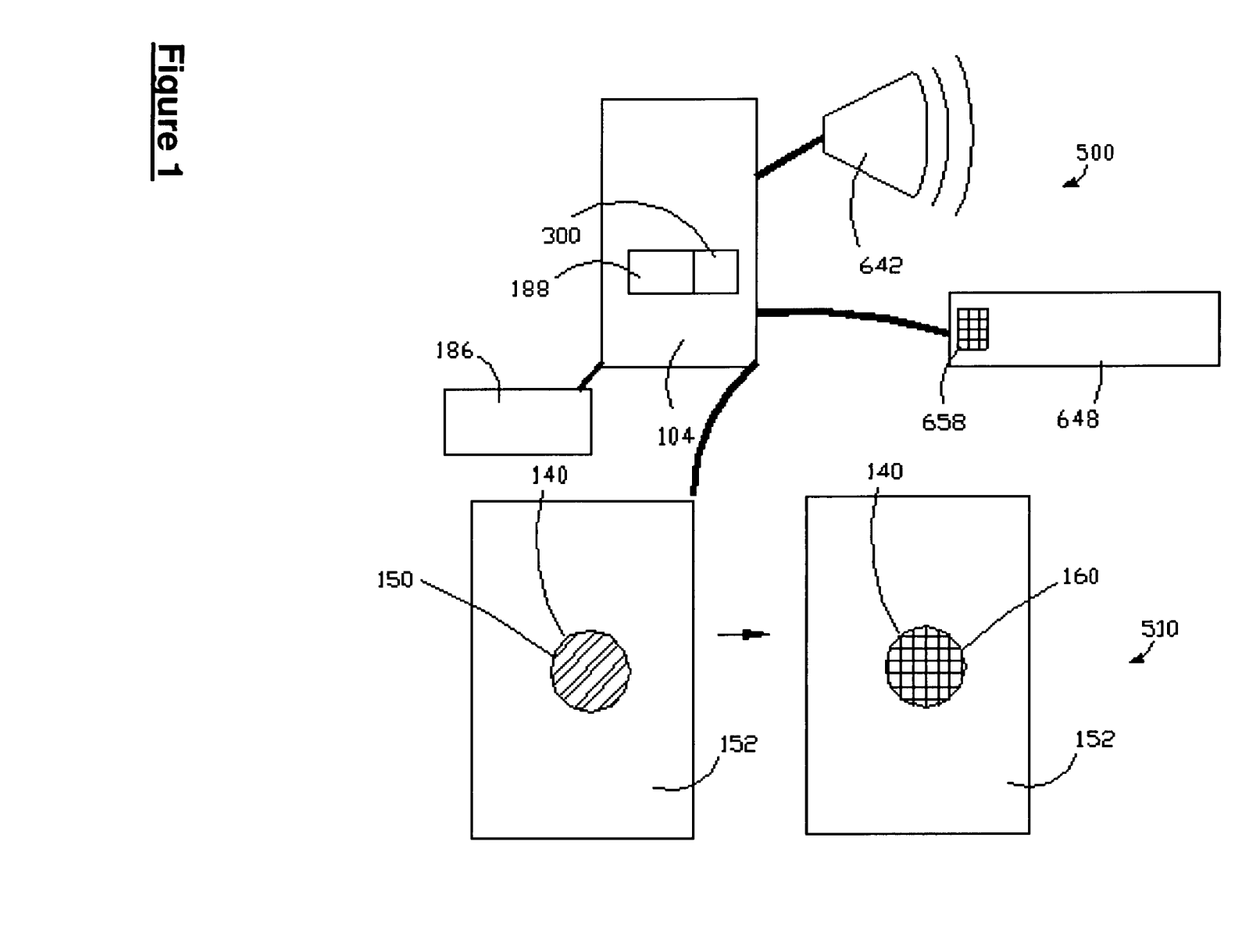
FIG. 1 shows the processing units for use with the displays of FIGS. 2, 3, 4, and 5, in accordance with an embodiment of the present invention.

Referring to FIG. 1, in broad terms, the present invention comprises a software program 300 in which a user responds to a series of audiovisual displays 152 and receives feedback on the quality of the responses, all substantially independent of clinical supervision.

Software program 300 installs, for example, on a digital storage 188 in a computer 500 commonly found in many homes. In addition to display 152 and storage 188, home computer 500 typically includes a keyboard 648 having an input key 658 such as the space bar, a processing unit 104, and a speaker 642.

Prior to each exercise, display 152 provides written instructions, instructing the user on how to properly respond to the upcoming exercise. Correctly following the instructions serves to enhance audiovisual skills including visual processing and concept comprehension.

Warm Up Exercise—Stationary Ball

Referring to FIG. 1, each session begins with a Warm-Up Exercise 510 comprising a stationary ball 140 that periodically changes colors, for example, from green 150 to red 160, represented by parallel lines and hatched lines respectively. The user responds by pressing key 658 immediately upon recognizing the color change. The period of time from the color change to the user response, herein latency period, is digitally recorded and used in computing an evaluation parameter at the end of the session. Warm-Up Exercise 510 prepares the user for subsequent exercises and enhances attention skills, including range of focus, selective attention, and sensory motor coordination.

As used herein, ball 140 changing color is described, for example, as changing color "from green 150 to red 160", while ball 140 having an unchanging color, for example, is described as "red ball 160".

Exercise One—Moving Ball

Figure 2:
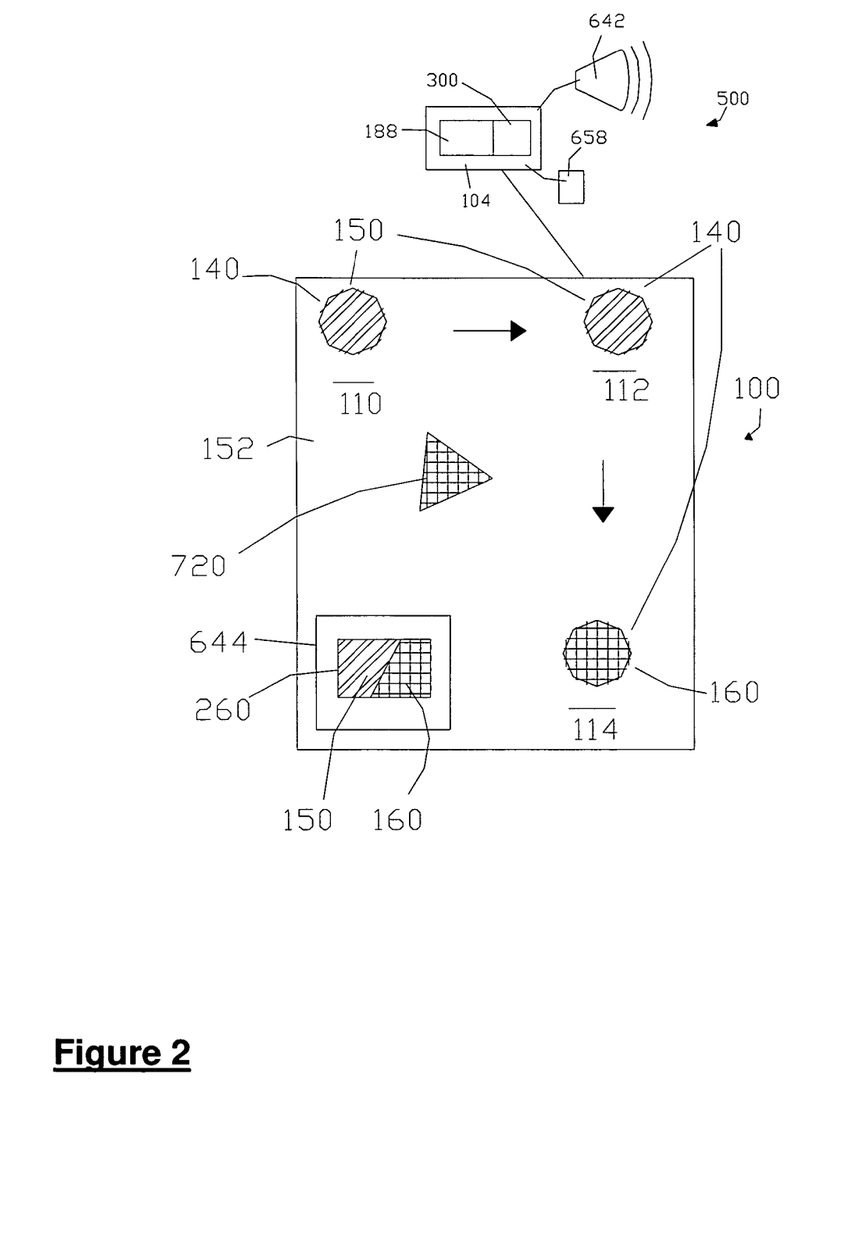
FIGS. 2, 3, 4, and 5 show cognitive enhancement displays, in accordance with an embodiment of the present invention.

Referring to FIG. 2, after warm-up 510, display 152 provides instructions for Exercise One 100 at a basic level of difficulty, following which, green ball 150 moves from a first position 110 to a second position 112 and a third position 114 while periodically changing colors, for example, from green 150 to red 160. Upon observing the color change, the user presses key 658 and the latency period is recorded by computer 500. Ball 140 continues moving to subsequent positions, changing color over randomly varied periods of time and, after a series of color changes, the exercise and level ends with the evaluation parameter being displayed on display 152.

At the completion of the basic level, the user may terminate the session or choose to progress to more difficult levels and onto further exercises. Whenever the user chooses to terminate, the exercise and level attained by the user is digitally recorded on computer 500 and, at a subsequent session, software 300, following a warm-up 100, automatically presents the user with the next exercise and/or level.

As used herein, a "moving" object refers to any change in position of displayed ball 140 in relation to the x and y coordinates of display 152, whether ball 140 moves at a constant rate of speed, changing rate of speed, and/or disappears from a first position and reappears at a second position.

Cognitive recognition of object movement often includes visual tracking, defined as changing eye position to maintain the object in a field of vision.

Relaxation Display

Figure 3:
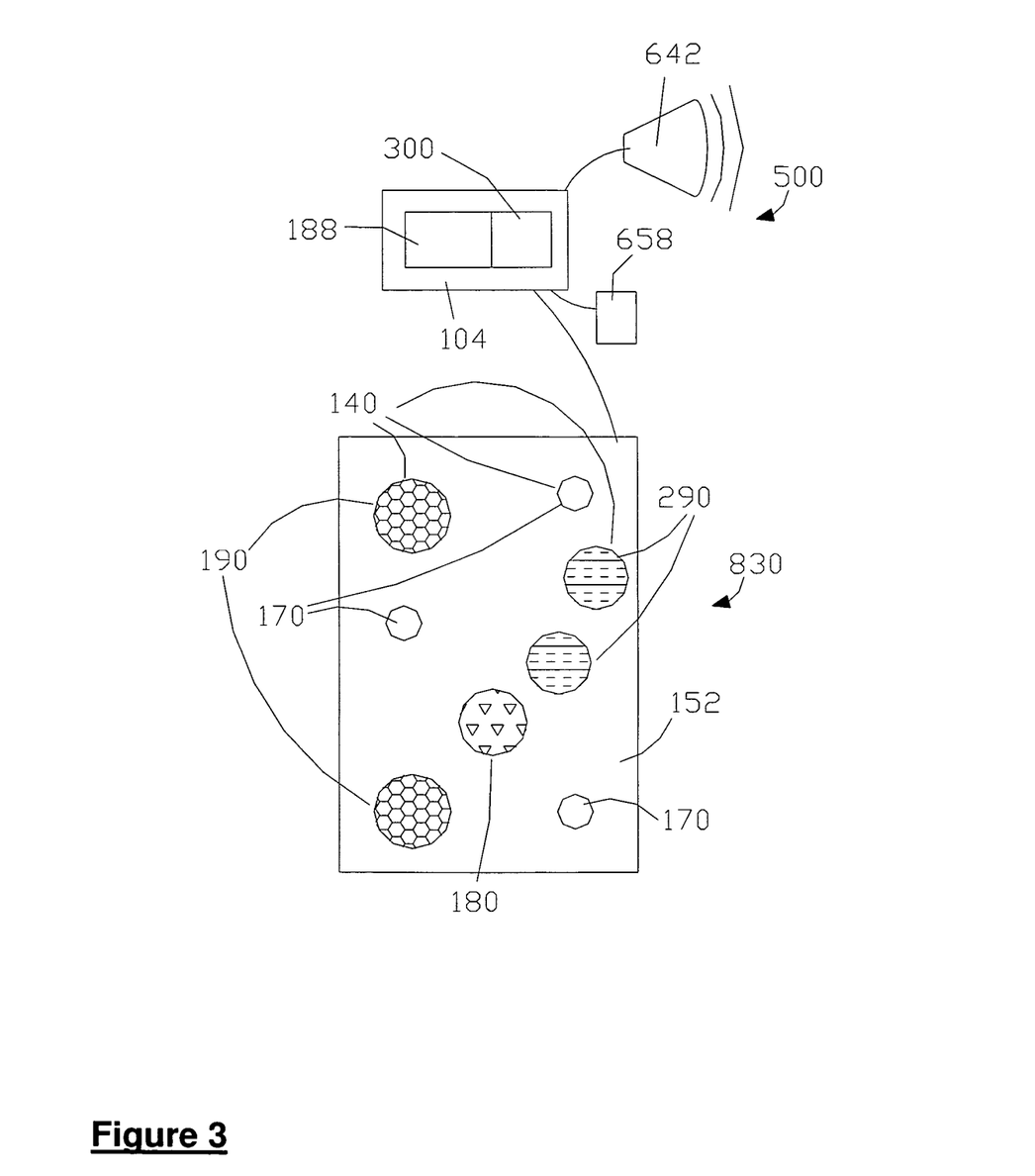

Relaxation display 830 accompanied by audio tones from speaker 642, seen in FIG. 3, interrupts movement of ball 140 for a period of time, for example, 6, to 10, seconds.

In an exemplary embodiment, relaxation display 830 includes a purple bubble 180 represented by triangles, a yellow bubble 190 represented by a honeycomb, a blue bubble 290 represented by horizontal lines, and white ball 170. Bubbles 180, 190, and 290 typically float from the bottom to the top of display 152 and enhance user ability to defocus from a concentrative mental state during ball movement 140 to a relaxed state during relaxation display 830.

A single tone is typically sounded as relaxation display 830 finishes, signaling the user to refocus, and display 152 resumes with moving ball 140 that changes color. Relaxation display 700 enhances attention skills, including range of focus and attention flexibility, skills important for proper classroom learning and interaction.

Figure 4:
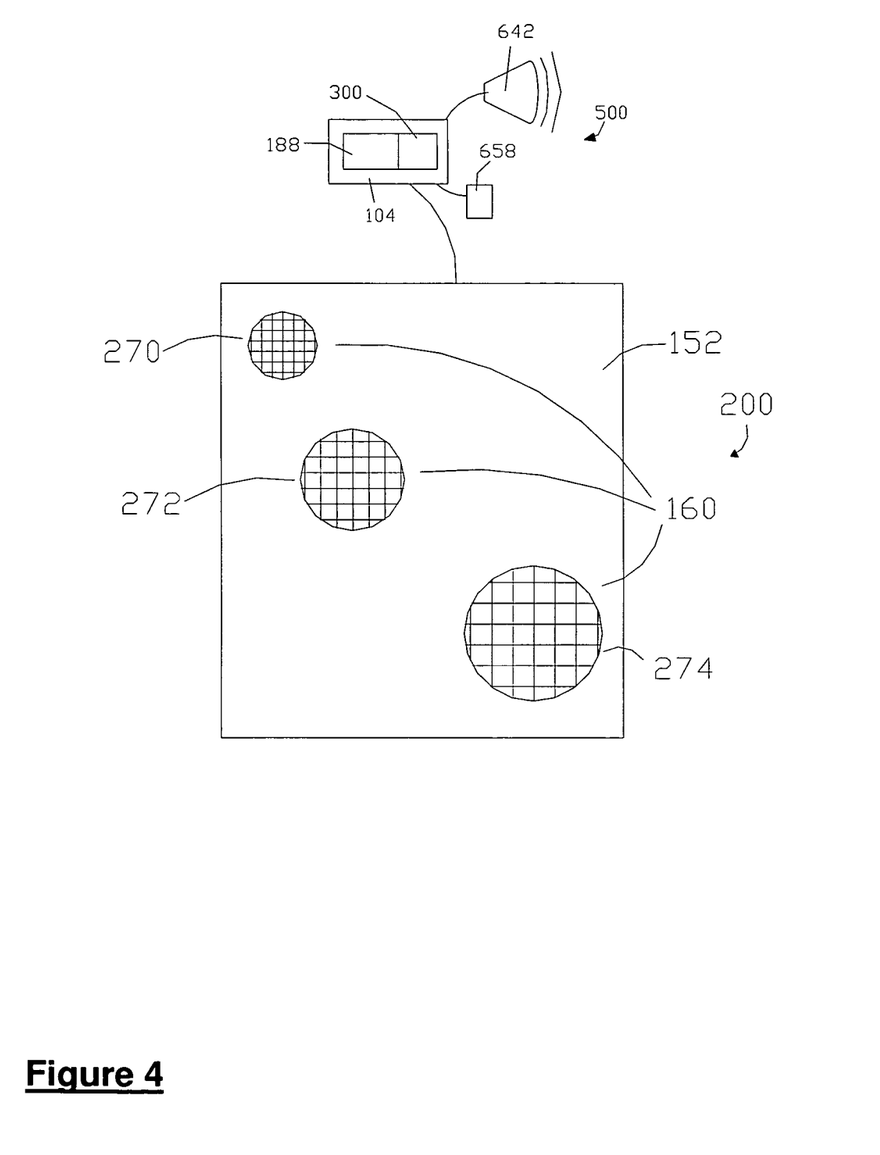

As seen in a display 200 (FIG. 4), ball 140 may be displayed in different sizes, for example, large 274, intermediate 272, and small 270 sizes, corresponding to basic, intermediate, and advanced levels. In conjunction with the changes in size, the number of relaxation displays 830 is decreased as summarized in the following chart:

| Level | Relaxation Displays | Ball Size |
| --- | --- | --- |
| Basic | 5 | Larger |
| Intermediate | 4 | Medium |
| Advanced | 3 | Smaller |

Additionally, cueing module 400 (FIG. 5) displays a variety of cues that encourage the user to respond correctly. For example, if the user fails to press key 658 within the first 1.5, seconds, an admonition display, including the word "MISS" 422, will appear for a brief period of time on display 152 and/or speaker 642 will emit a sound. Additionally, if the user presses key 658 without ball 140 changing color, "MISS" 422 will be similarly displayed.

Figure 5:
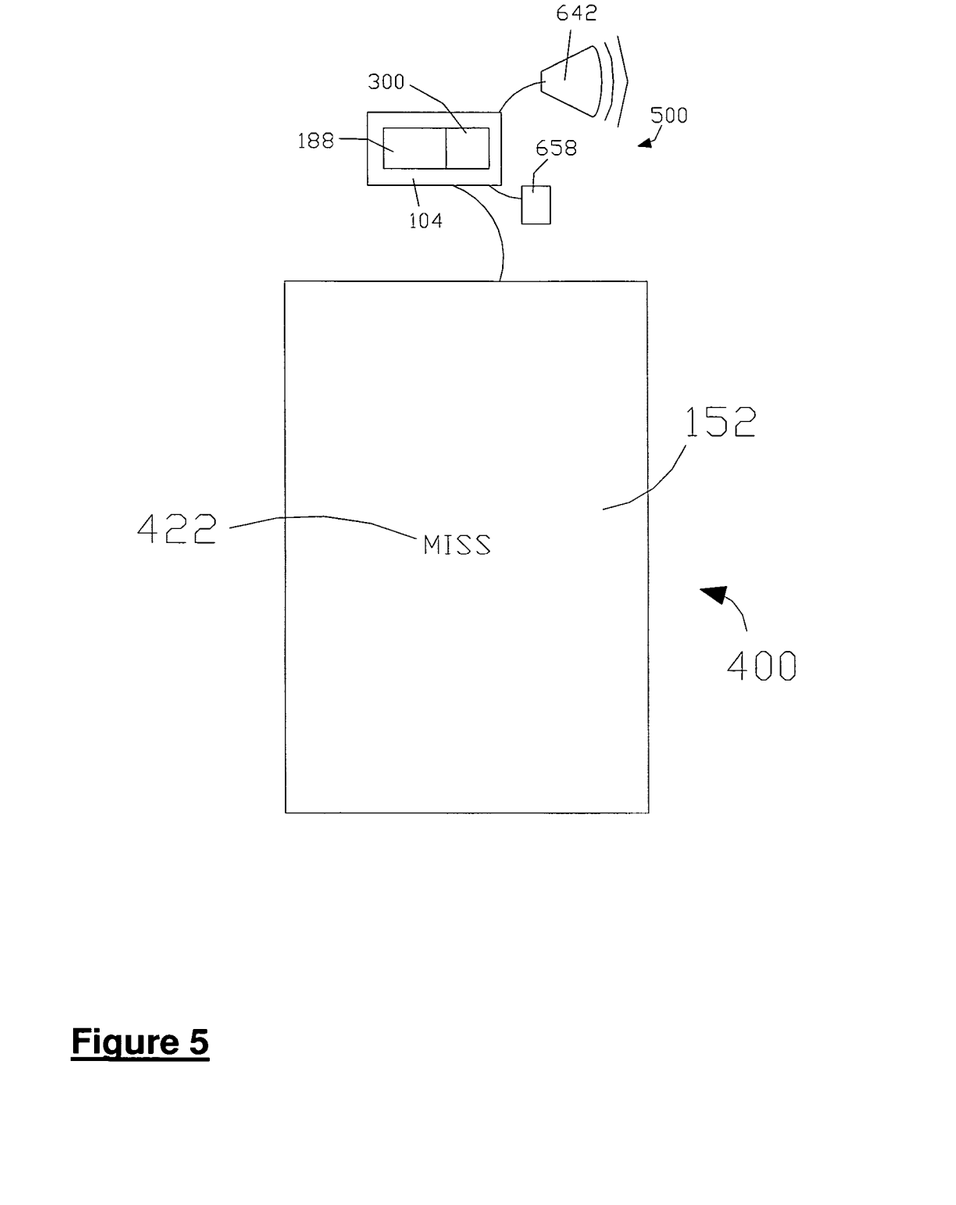

The user recognition of the change in ball color 140 enhances attention skills, including range of focus, selective attention, attention duration, and sensory motor coordination.

Scoring

At the end of each exercise, an evaluation parameter comprising a percentage is presented on display 152 or printed on a printer 186 (FIG. 1), the percentage being calculated from a perfect score versus the actual score attained by the user. Based upon the following chart:

| Latency Period (sec.) | Points |
|---|---|
| 0.5 | 5 |
| 0.5-1.0 | 3 |
| 1.0-1.5 | 1 |
| 1.5+ | −3 |
| No Response | −5 |
| False Response | −5 |

For example, if ball 140 changed color 20, times, were the user to respond correctly each time with 0.5, second latency period, the user would have obtained the maximum score of 100. If, in actuality, the user attained 50, points, the user receives an evaluation of 50, out of 100,, or 50, percent.

In addition to the evaluation parameter comprising a percentage, the user is apprised of a number of additional evaluation parameters including omissions and commissions; omissions being defined herein as the failure to press key 658 following ball 140 color change; commissions being defined herein as the number of times key 658 was pressed when there was no change in ball 140 color.

The evaluation parameters serve as a reward to the user and encourage the user to improve cognitive recognition.

Brain Wave Enhancement

Figure 6:
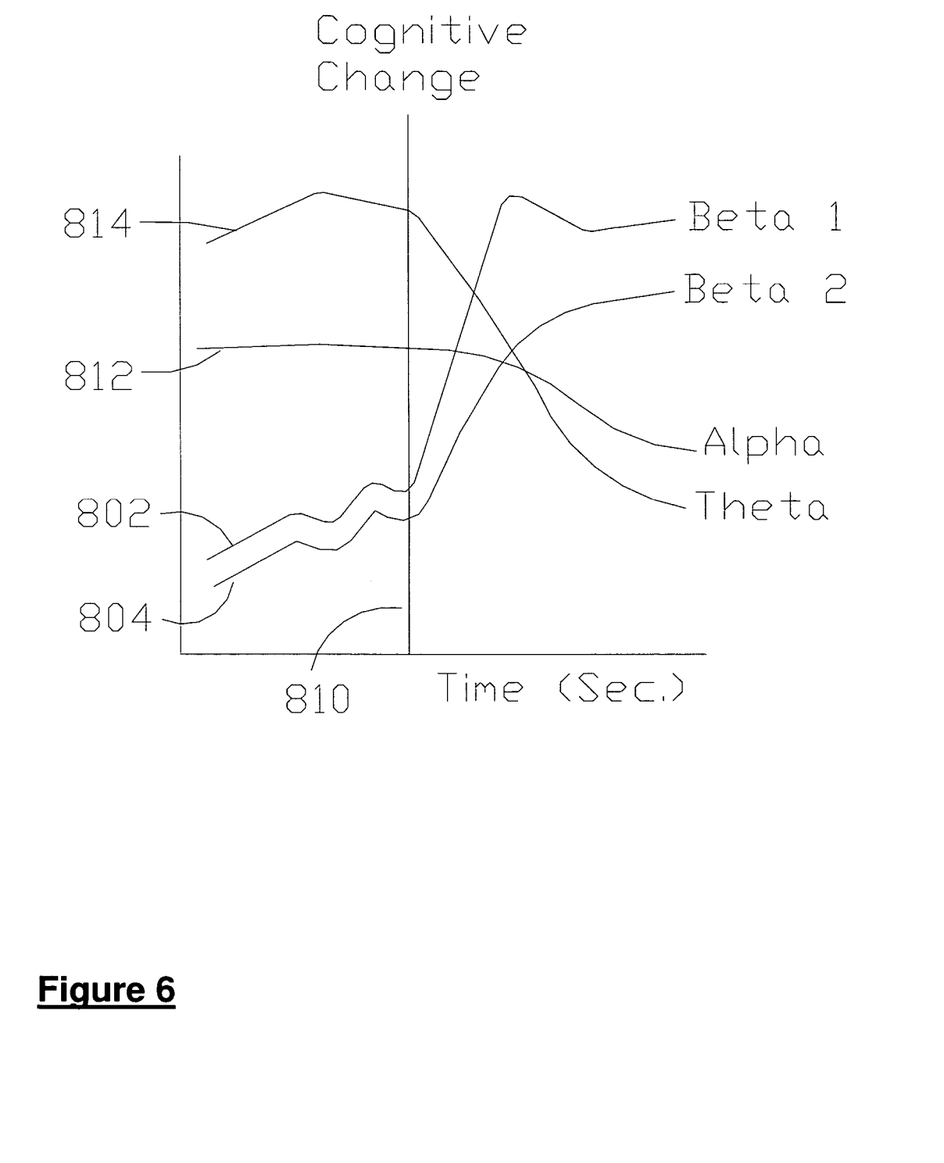
FIGS. 6, 7, and 8 show graphs of brain waves associated with cognitive enhancement displays, in accordance with an embodiment of the present invention.
Figure 7:
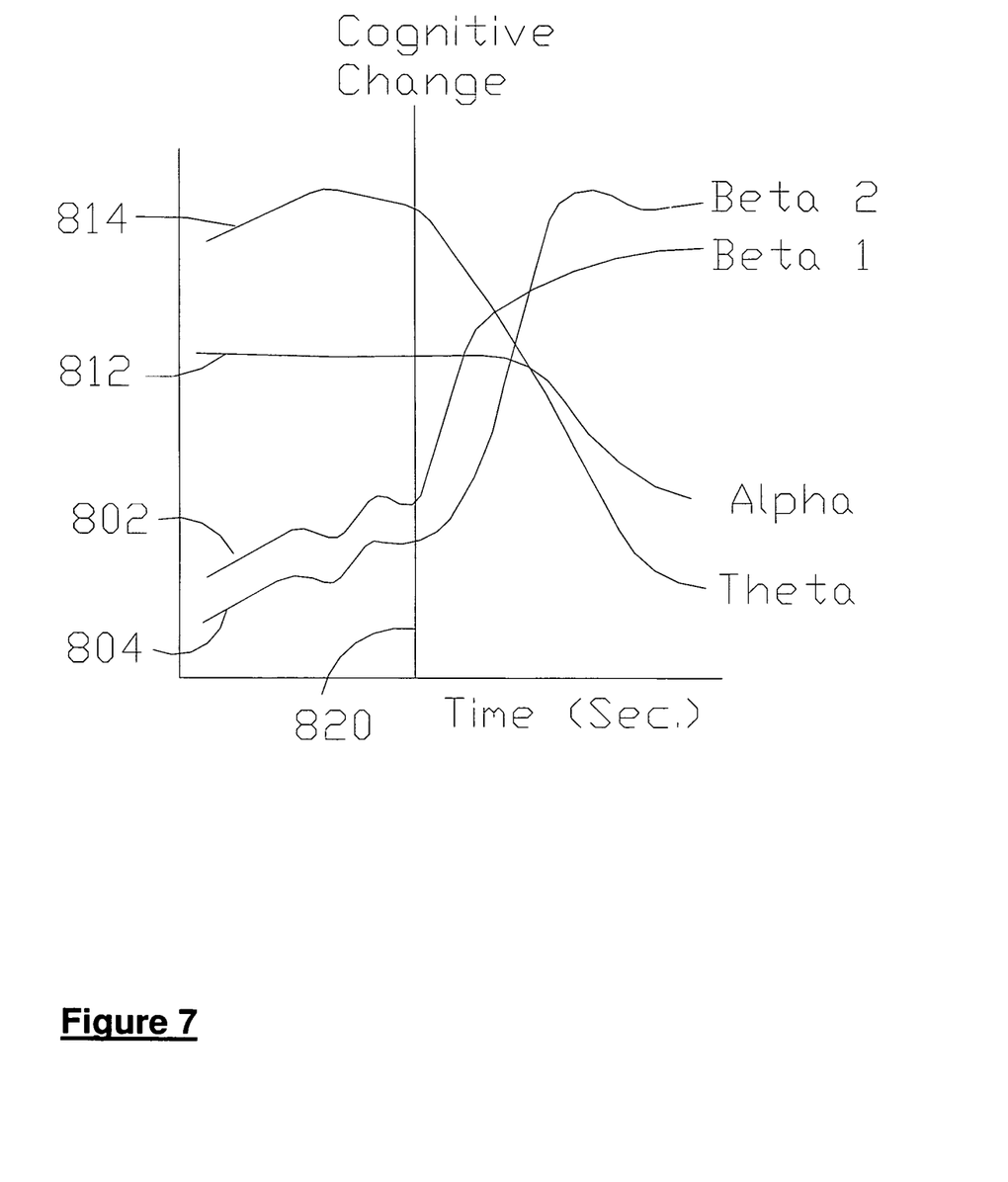

FIGS. 6 and 7 are graphic representations 800 of brain waves often occurring with cognitive changes 810 and 820, associated with a slow moving and a fast moving ball respectively.

Prior to cognitive changes 810 and 820, Beta-1, 802 and Beta-2, 804 waves are often depressed while Alpha 812 and Theta 814 waves are often elevated; a pattern associated with impeded user concentration.

Slow movement cognitive change 810 typically results in a dramatic increase in Beta-1, 802 waves and a moderate increase in Beta-2, 804 waves. In fast movement cognitive change 820, the reverse often occurs; a dramatic increase in Beta-2, 804 waves and a moderate increase in Beta-1, 802 waves.

As seen in FIGS. 6 and 7, wave patterns associated with cognitive changes 810 and 820 typically include suppression of Alpha 812 and Theta 814 waves that, in conjunction with the above-noted changes in Beta waves 802 and 804, are associated with enhanced user concentration.

While prior to cognitive changes 810 and 820, Alpha 812 waves are shown at a higher level than Theta 814 waves, in some cases Theta 814 waves may initially be at a higher level than Alpha 812 waves. Whether Alpha 812 or Theta 814 waves are higher initially, the resultant wave patterns following cognitive changes 810 and 820 will substantially remain the same as shown.

Figure 8:
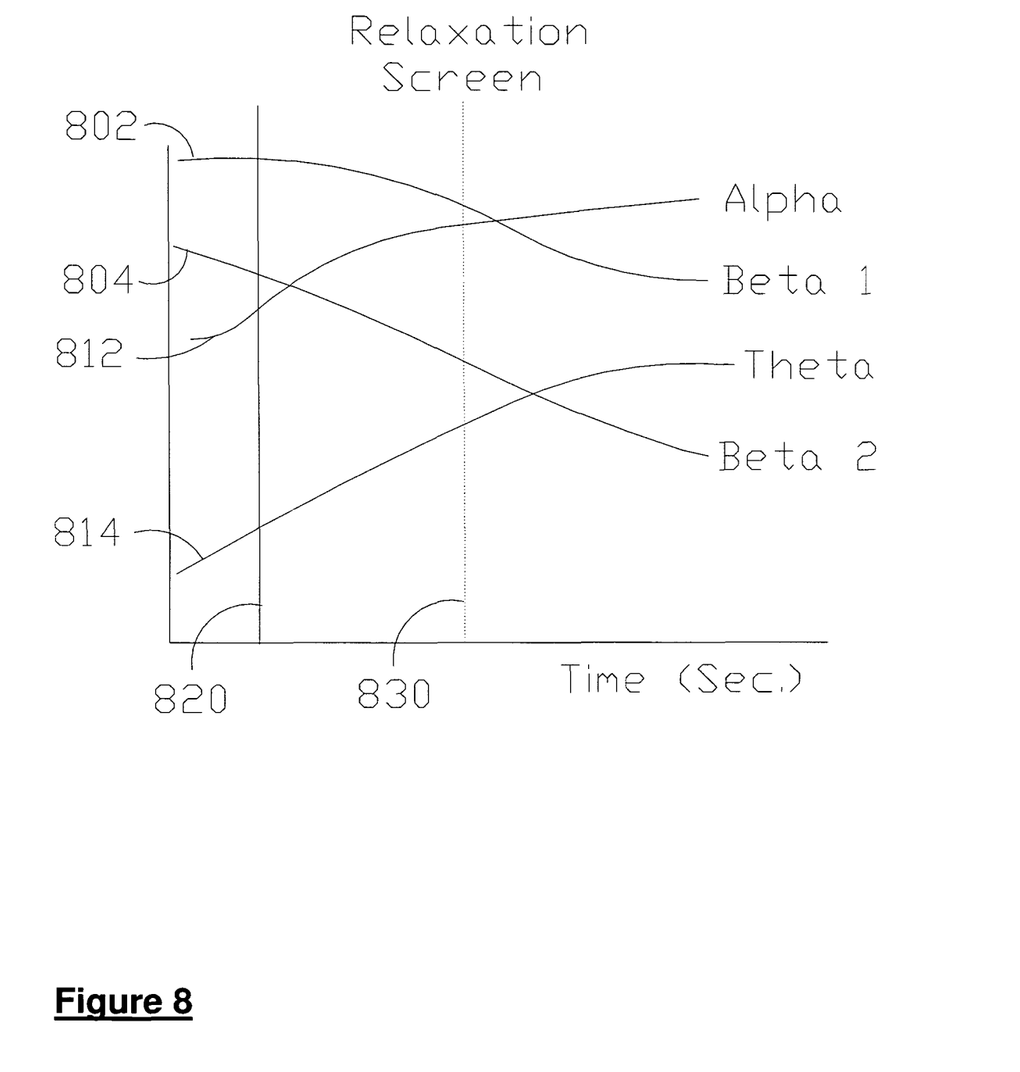

FIG. 8 demonstrates brain wave changes associated with relaxation display 830 following cognitive change 820. Relaxation display 830 typically causes reduction of Beta-1, 802 and Beta-2, 804 waves while Alpha 812 and Theta 814 waves increase with Alpha 812 waves being dominant.

Repetition of slow 810 or fast 820 cognitive changes, interspersed with relaxation displays 830, enhances range of focus attention skills, teaching the user to focus and defocus at will; indispensable skills whenever learning is taking place.

Software Modules

Figure 9:
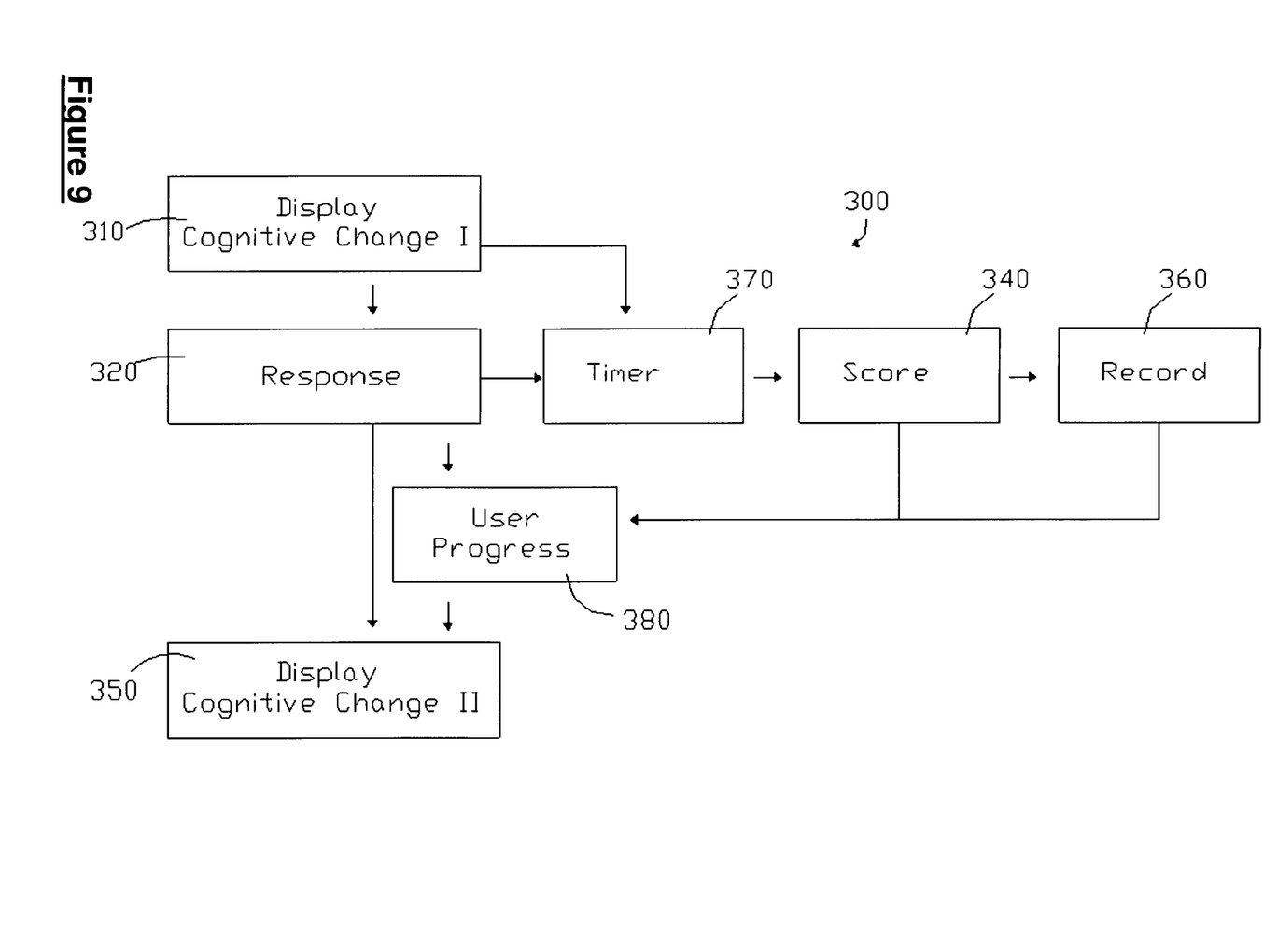
FIG. 9 shows a block diagram of a cognitive enhancement software program, in accordance with an embodiment of the present invention.

FIG. 9 shows a block diagram of software program 300, according to an exemplary embodiment of the invention. At a cognitive change 1 310, software 300 displays a cognitive change to which the user responds at response 320 while a timer module 370 determines the latency period. Following a number of interactions at the end of a particular level, the user is shown a score 340.

In an exemplary embodiment, score 340 is stored as a record 360 and used as a basis for generating an evaluation 380 of user progress, for example, during a session. Following evaluation 380, a display 350 presents a new exercise and/or exercise level.

As used herein, software 300 refers to any digital program designed to run in conjunction with a digital controller, for example, a hand-held gaming unit 930 (FIG. 10) or home computer 500 (FIG. 1). Additionally or alternatively, unit 930 may be adapted to connect to an external display (not shown), for example, a television.

Figure 10:
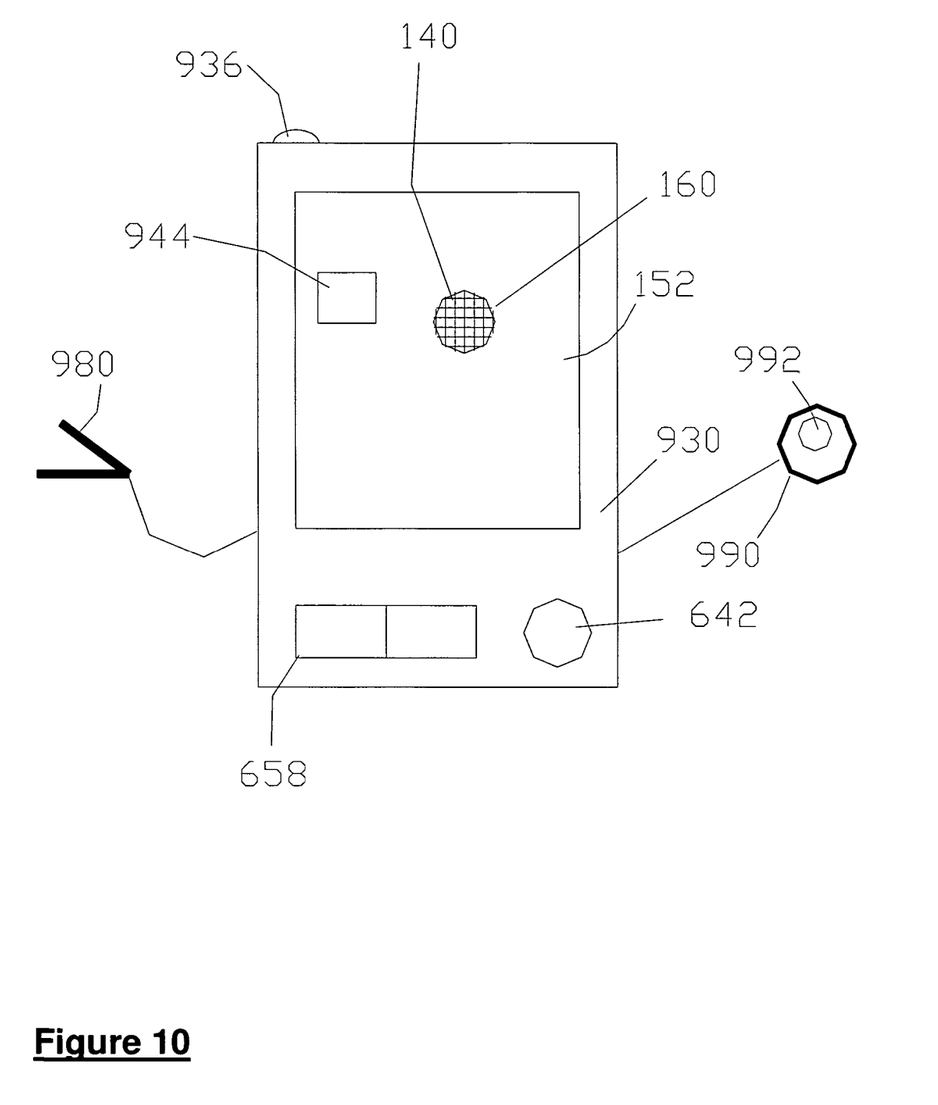
FIG. 10 shows processing units for use with the displays of FIGS. 2, 3, 4, and 5, in accordance with an embodiment of the present invention.

In some embodiments, software 300 may be contained on a non-erasable storage medium, for example, a chip that is either integrated or inserted into unit 930. Additionally or alternatively, software 300 may be downloaded into unit 930, for example, from home computer 500 using a wireless hook-up, for example, via an infra red sensor 936. Optionally, user progress, including evaluation parameters, may be uploaded to computer 500 for review by a supervisor, for example, a parent.

In still another embodiment, software 300 may be adapted to run on a cell phone having a display (not shown) or via the Internet, for example, at a website dedicated to cognitive enhancement; the many options for running software 300 being well-known to those familiar with the art.

Accessories

As seen in FIG. 10, unit 930 is adapted to include any one of a variety of input devices, for example, a foot pedal 980 upon which the user steps to signal recognition of a cognitive change, thereby enhancing motor skills associated with the lower extremity.

Another example of an input device is a hand-held rubber ball 990 that includes a sensor 992 that senses the strength of the user's squeeze. Ball 990 optionally provides an auditory or visual output when the user crosses a pre-programmed pressure threshold, thereby enhancing user hand—muscle strength and coordination.

In still another embodiment, display 152 may be touch-sensitive and the user signals cognitive recognition by touching a visual cue 944 that optionally changes position, thereby enhancing motor skills associated with hand movement. The many user accessories for enhancing specific motor skills will be readily evident to those familiar with the art.

Exercise Two—Visual Avoidance

Figure 11:
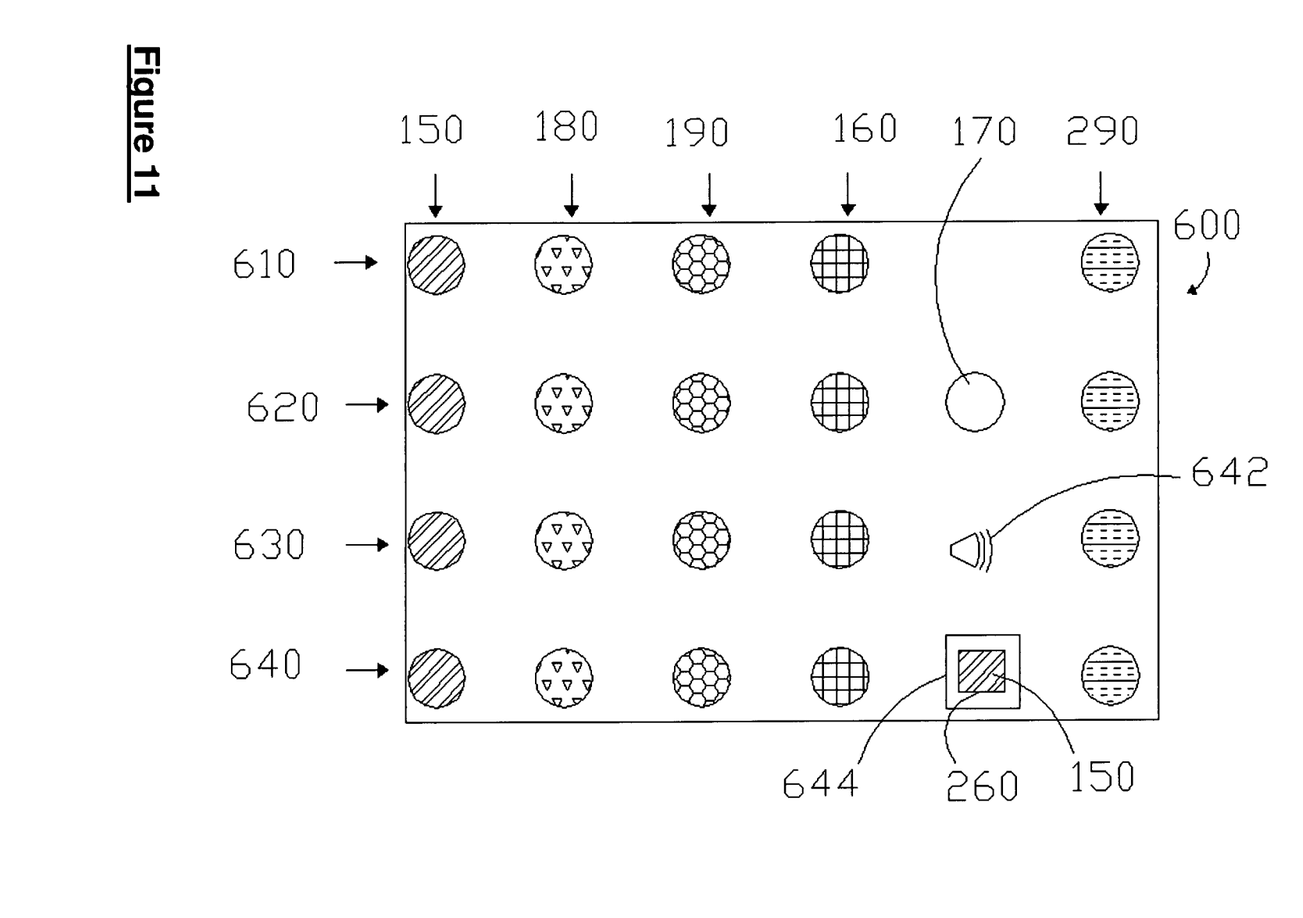
FIG. 11 shows a chart of cognitive enhancement sequences, in accordance with an embodiment of the present invention.

FIG. 11 shows a schematic chart 600 of but a few examples of the various exercises that may be displayed by software 300, with a row 610 representing Exercise One in which green ball 150 changes to purple 180, yellow 190, red 160, and blue 290.

As shown in a row 620 representing Exercise Two, color changes, sizes of ball 140, and relaxation displays 830 are similar to those displayed in Exercise One; however, the user must avoid pressing key 658 if ball 140 turns a white color 170.

Exercise Two enhances both attention skills including range of focus, short term memory, and divided attention and mental processing skills including information discrimination.

Exercise Three—Auditory Avoidance

As shown in a row 630, Exercise Three differs from Exercise One in that the user avoids pressing key 658 after a tone from speaker 642 is sounded. Exercise Three enhances audiovisual skills including auditory processing and audiovisual coordination.

Exercise Four—Visual Perception

As shown in a row 640, Exercise Four differs from Exercise One in that the user presses key 658 when both a box 644 and ball 140 display the same color, for example, green 150. Additionally, box 644 may move periodically around display 152.

Exercise Four enhances attention skills including simultaneous attention and mental processing including peripheral vision and sequential processing.

Exercises Five to Eight—Speed Increase

Exercises Five to Eight are similar to Exercises One to Four with the addition of faster movement of ball 140 across display 152 as per the following chart:

| Exercise | Ball Speed | Level |
|---|---|---|
| 1-4 | Slow | Basic |
|  |  | Intermediate |
|  |  | Advanced |
| 5-8 | Fast | Basic |
|  |  | Intermediate |
|  |  | Advanced |

Exercises Five to Eight enhance attention skills including attention duration and mental processing skills including speed of processing.

Exercises Nine to Twelve—Distraction Intervention

Exercises Nine to Twelve are similar to Exercises Five to Eight with the addition of a distracting object, for example, a distraction triangle 720 (FIG. 2). Distraction triangle 720 may appear for a few seconds at a first location, disappear and reappear at a second location. Additionally or alternatively, distracting sounds, for example, tones, may periodically emanate from speaker 642. Distraction triangle 720 and distracting sounds enhance attention skills including selective attention, and audiovisual skills including auditory processing, visual processing, and audiovisual coordination.

Exercise Thirteen—Visual Avoidance

In Exercise Thirteen, ball 140 moves on display 152 as in Exercise Three (FIG. 1) while verbal instructions are given to the user, for example, to:

1. Avoid pressing key 658 when ball 140 is red 160;
2. Avoid pressing key 658 when ball 140 changes through a sequence of colors, for example, from green 150 to red 160;
3. Press key 658 twice when ball 140 becomes red 160; and/or
4. Press key 658 twice when ball 140 changes through a sequence from green 150 to red 160.

The addition of Exercise Thirteen verbal instructions further enhances user F audiovisual processing skills including auditory processing, mental processing skills including sequential processing, and audiovisual skills including audiovisual coordination.

Exercise Fourteen—Visual Sequencing

Exercise Fourteen, seen in row 640 of FIG. 11, is similar to Exercise Four with the addition that square 260 displays changing color. As seen in FIG. 2, box 644 changes color, for example, from green 150 to red 160, represented by square 260 divided diagonally into green 150 and red 160 colors. The user is instructed to press key 658 only when ball 140 similarly changes color, in this example from green 150 to red 160.

Exercise Fourteen further enhances attention skills including attention duration, divided attention, and short-term memory and mental processing skills including peripheral vision and multitasking.

Exercise Fifteen—Visual Sequence Avoidance

Exercise Fifteen is similar to Exercise Fourteen, however, when box 644 displays a sequence of colors that matches the sequence of colors of ball 140, the user is instructed not to press key 658.

Exercise Fifteen further enhances attention skills including working memory, short term memory, and divided attention, mental processing skills including sequential processing, peripheral vision, and multitasking, and audiovisual skills including visual processing.

Exercise Sixteen—Auditory Avoidance

In Exercise Sixteen, the user is instructed to:

1. Avoid pressing key 658 for one color change following a low pitched auditory signal from speaker 642; and/or
2. Avoid pressing key 658 for two color changes following a high pitched auditory signal from speaker 642.

Exercise Sixteen further enhances attention skills including working memory and short term memory, mental processing skills including information discrimination and multitasking, and audiovisual skills including audiovisual coordination.

Exercises Seventeen to Twenty—Increased Ball Speed

Exercises Seventeen to Twenty are similar to Levels 13, to 16, with ball 140 moving faster. Exercises Seventeen to Twenty further enhance mental processing skills including processing speed.

Supervised and Unsupervised Versions

In one embodiment of the invention, software 300 (FIG. 9) progresses through the various exercises automatically, without supervision. Additionally or alternatively, a version is provided that allows a supervisor, optionally without professional training, to change the order of various exercises.

In the supervised version, the supervisor may input a cue causing repetition of a specific exercise, thereby reinforcing associated cognitive skills. In an exemplary embodiment, the input cue is known only to the supervisor to prevent the user from inappropriately cueing the program to skip exercises.

Epilogue

While the invention has been described with respect to a limited number of embodiments, it will be appreciated that many variations, modifications and other applications of the invention may be made, for example, in audiovisual displays and instructions to the user. Such modifications, for example, may be designed to enhance specific cognitive skills, for example, sensory motor coordination skills. Additionally, the invention is not limited to the colors or shapes described in the examples.

Also, combinations of elements and/or variations in elements may be combined and single elements may be used, for example, providing the user with a signal button in place of a keyboard key. Such variations and modifications, as well as others that may become apparent to those skilled in the art, are intended to be included within the scope of the invention, as defined by the appended claims.

The terms "include", "comprise" and "have" and their conjugates as used herein mean "including but not necessarily limited to."

It will be appreciated by a person skilled in the art that the present invention is not limited by what has thus far been described. Rather, the scope of the present invention is limited only by the following claims.

The invention claimed is:

1. A computerized method for evaluating and enhancing cognitive skills of a subject using an animation program and cognitive enhancement module, wherein the cognitive enhancement module sets the playing parameters of the animation program, the method comprising:
displaying a series of animation exercises of at least one moving object on a display screen, wherein at least one object cognitively recognizable property is changed during each exercise;
measuring a period of latency from an object property change to a subject's reaction to the object property change;
checking whether the subject successfully identifies the object property change;
producing temporary cognitive pauses interspersed within an animation exercise by displaying pre-defined number of relaxation animations interspersed during the exercise, wherein the pre-defined number of animations is determined before the exercise starts, each temporary cognitive pause:
beginning on occasion, and
extending for a specified time period that is based on a desired cognitive skill level of the subject;
creating both auditory and visual distractions in at least one level, which draw subject attention from current animation play, training him to ignore distractions, wherein the distractions are generated according to determined cognitive skill;
evaluating the latency period of said subject by comparing the measured period of latency to minimal period of latency, the evaluation processed by the cognitive enhancement module;
setting playing parameters of an animation and evaluation module for comparing the measured period of latency to a predefined minimal period of latency and determining the displayed object changing properties and rate of for the next animation exercise,
wherein the setting is based on a measured period of latency evaluation, user success and the difficulty level which correspond to determined cognitive function and skill, where the difficulty level is increased at each consecutive animation exercise, and
wherein in each animation exercise, the movement speed, the changing property and pattern of the object are determined by the cognitive enhancement module according to determined cognitive functionalities level associated with a presently running animation exercise.

2. The method of claim 1, wherein at a first level of animation exercise includes five relaxation periods, at a second animation exercise include four relaxation periods and the third level animation exercise includes three relaxation periods.

3. A non-transitory computer readable medium comprising instructions which configure a processor to evaluate and enhancing cognitive skills of a subject by executing:
an animation module that includes:
(i) an animation playing module that displays series of animation exercises of at least one moving object on a display screen, where at least one object cognitively recognizable property is changed during each exercise,
(ii) an interaction module that measures a period of latency from an object property change to a subject's reaction to the object property change and checks whether the user successfully identifies the object property change,
(iii) a relaxation module that produces a temporary cognitive pauses interspersed within an animation exercise by displaying pre-determined number of relaxation animations interspersed during the exercise, wherein the pre-determined number of animations is determined before the exercise starts, each temporary cognitive pause:
beginning on occasion, and
extending for a specified time period that is based on a desired cognitive skill level of the subject,
(iv) a distraction module that creates both auditory and visual distractions in at least one level, which draw subject attention from current animation play, training him to ignore distractions, wherein the distractions are generated according to determined cognitive skill; and
a cognitive enhancement module that sets playing parameters of an animation and evaluation module for comparing the measured period of latency to a minimal period of latency and determining the displayed object changing properties and rate of for the next animation exercise,
wherein said determination is based on a period of latency evaluation, user success and the difficulty level which correspond to determined cognitive function and skill, where the difficulty level is increased at each consecutive animation exercise, and
wherein in each animation exercise, the movement speed, the changing property and pattern of the object are determined by the cognitive enhancement module according to determined cognitive functionalities level associated with a presently running animation exercise.

4. A program according to claim 3, wherein the cognitively recognizable changing in the at least one first property includes at least one change in color.

5. A program according to claim 3, wherein the cognitively recognizable changing includes changing at least one second property, the second property including changing position during at least one first period of time.

6. A program according to claim 3, wherein following the evaluation, the animation module is adapted to automatically display at least one second display including at least one first object periodically changing at least one first property and at least one second property, the at least one second property including:
changing during the at least one first period of time; and
changing during at least one second period of time, the second period of time being shorter than the first period of time.

7. A program according to claim 3, wherein the animation module is adapted to automatically display the at least one first object in at least one of:
a same size;
an intermediate size; and
a large size.

8. A program according to claim 7, wherein the animation module includes an audio module operatively associated with the animation module, the audio module signaling the user to respond to the at least one first cognitively recognizable property by at least one of:
signaling; and
refraining from signaling.

9. A program according to claim 8, wherein the animation module includes at least one second object that changes a property and is cognitively distinct from the at least one first object, the change signaling the user to respond with at least one of:

signaling; and refraining from signaling.

10. A program according to claim 3, wherein the animations exercises include level of at least one:
- initial level of complexity;
- intermediate level of complexity; and
- advanced level of complexity.

11. A program according to claim 3, wherein the recognition is configured to enhance at least one desirable brain wave, including at least one wave of:
- beta 1; and
- beta 2.

12. A program according to claim 3, wherein the recognition is configured to suppress at least one undesirable brain wave, including at least one wave of:
- theta; and
- alpha.

13. A program according to claim 3, wherein the at least one enhanced cognitive skill comprises a cognitive skill from at least one of the following cognitive skill categories:
- attention skills;
- mental processing skills; and
- audiovisual skills.

14. The non-transitory computer readable medium of claim 3, wherein the animation exercises series include the combination sequence of the following levels of exercises:
- at least one level for enhancing a first cognitive skill of visual tracking, visual processing and improving eye-hand coordination cognitive functions;
- at least level for training a second cognitive skill of working memory cognitive function, said level exercise change includes instructing the subject to avoid reaction when a certain property of the object is displayed, wherein the subject is required to memorize certain property throughout the animation exercise;
- at least one level for training a second cognitive skill of auditory processing and visual-auditory coordination cognitive functions, said level exercise change includes instructing the subject to avoid reaction when an audio stimuli is generated; and
- at least one level for training a second cognitive skill of multitasking and divided attention cognitive functions, said level exercise change includes requesting the user to skip all the objects that have the same color as the color appearing at designated position on the screen.

15. The non-transitory computer readable medium of claim 3, wherein each relaxation animation comprises slow moving objects configured to cause a brain of the subject to move from a Beta state to an Alpha or Theta state, and wherein an end of each relaxation period is signaled by a single tone sound that promotes the brain to transition from the Alpha or Theta state back to a Beta state.

16. The method of claim 15, wherein the end of each relaxation period is signaled by a single tone of a high pitch tone.

\* \* \* \* \*